Dec. 13, 1966  G. J. SHELDON  3,291,584
FIBER GLASS ORIFICE

Filed June 20, 1963  2 Sheets-Sheet 1

GILBERT J. SHELDON
INVENTOR.

BY

ATTORNEYS

Dec. 13, 1966   G. J. SHELDON   3,291,584
FIBER GLASS ORIFICE
Filed June 20, 1963   2 Sheets-Sheet 2
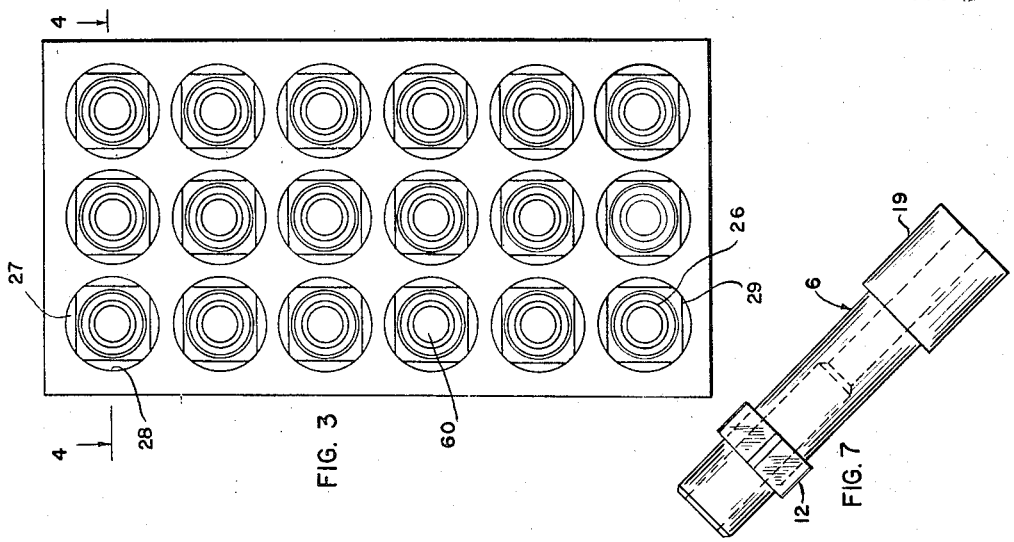
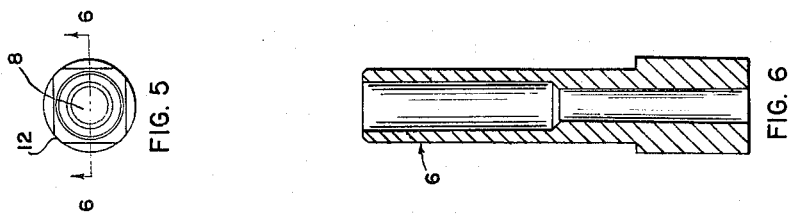
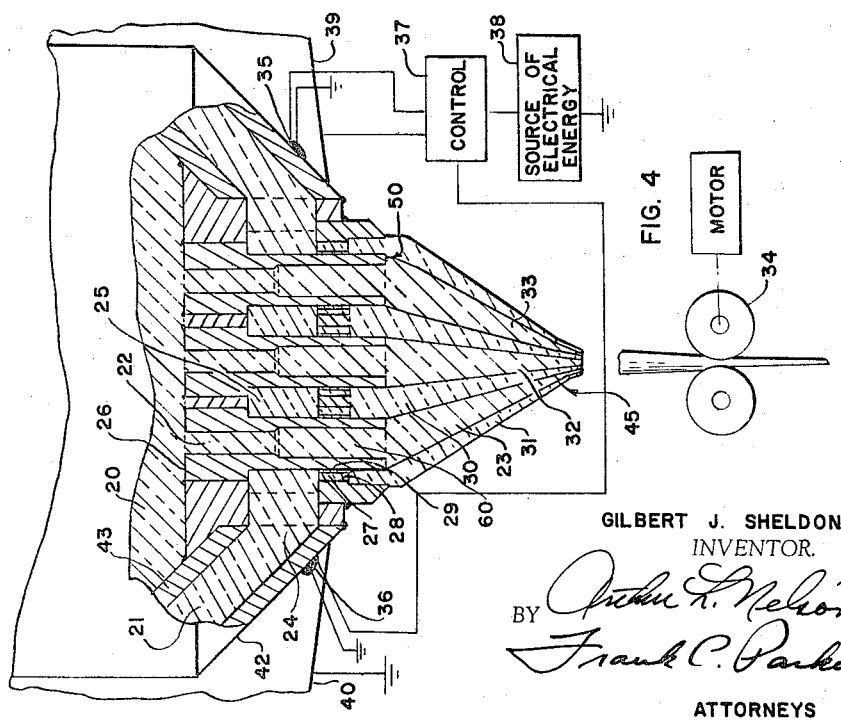
GILBERT J. SHELDON
INVENTOR.
BY
ATTORNEYS

United States Patent Office 3,291,584
Patented Dec. 13, 1966

3,291,584
FIBER GLASS ORIFICE
Gilbert J. Sheldon, Irondequoit, N.Y., assignor to Bausch & Lomb Incorporated, Rochester, N.Y., a corporation of New York
Filed June 20, 1963, Ser. No. 289,338
6 Claims. (Cl. 65—11)

This invention relates to glass manufacturing and more particularly to plural orifices and a method for making a plurality of coated glass fibers.

Plural orifices for simultaneously drawing fibers for use as light carriers or image carriers greatly increases the rate of fiber drawing. Where image carrying fibers are used the orientation of each of the plurality of fibers on the image receiving end relative to the image projecting end is of great importance. Accordingly this invention provides a means of making a plurality of coated ceramic fibers for image transmission. The relative position of each of the fibers is maintained throughout the length of the image carrying bundle. The fibers are not rotated on their axis relative to each other throughout the length of the bundle and the relative position of each of the fibers is fixed to form the same pattern at the image receiving as at the image projecting end of the bundle of the plurality of fibers. A common coating provides the coating of all of the fibers. A plurality of the bundles as drawn from the plural orifices may then be arranged in a suitable quantity and arrangement to provide the necessary total area for transmission of the image.

It is an object of this invention to provide a means for simultaneously forming a plurality of coated ceramic fibers.

It is another object of this invention to provide a method of simultaneously forming a plurality of coated ceramic fibers.

It is a further object of this invention to provide a means and a method for simultaneously forming a plurality of coated fibers having their axial centers in a predetermined arrangement and the cross sectional areas of the core and coating in a predetermined relationship relative to each other during the forming of the fibers.

It is a further object of this invention to provide a means and a method of simultaneously forming a plurality of fibers imbedded in a common coating material with the axial centers of the fibers in a predetermined spaced relationship to each other.

The objects of this invention are accomplished by maintaining a predetermined constant temperature or temperatures on two bodies of molten glass to control their viscosity. A plurality of orifices are in communication with each of the bodies of molten glass for restricting the relative rate of flow from each of said bodies of glass and thereby control the area relationship of the coating and the core of the fiber glass. The plurality of fibers are then drawn simultaneously from the bodies of molten glass through the orifices to provide a predetermined arrangement of plural fibers drawn in a common coating material. Subsequent to drawing of the fibers any additional processing of the fibers to combine a number of bundles may be provided.

The advantages of the method and means as set forth in this invention will become apparent to those skilled in the art from the following description and drawings.

FIG. 3 is a modification illustrating a different arrangement of the plurality of orifices in a lower view.

FIG. 4 is a cross section view taken on line 4—4 of FIG. 3.

FIG. 5 is an end view of a sleeve forming a single orifice of the plural arrangement as illustrated in the previous views.

FIG. 6 is a cross section view taken on line 6—6 of FIG. 5 without the alignment collar.

FIG. 7 is a side view of FIG. 5.

Figure 1:
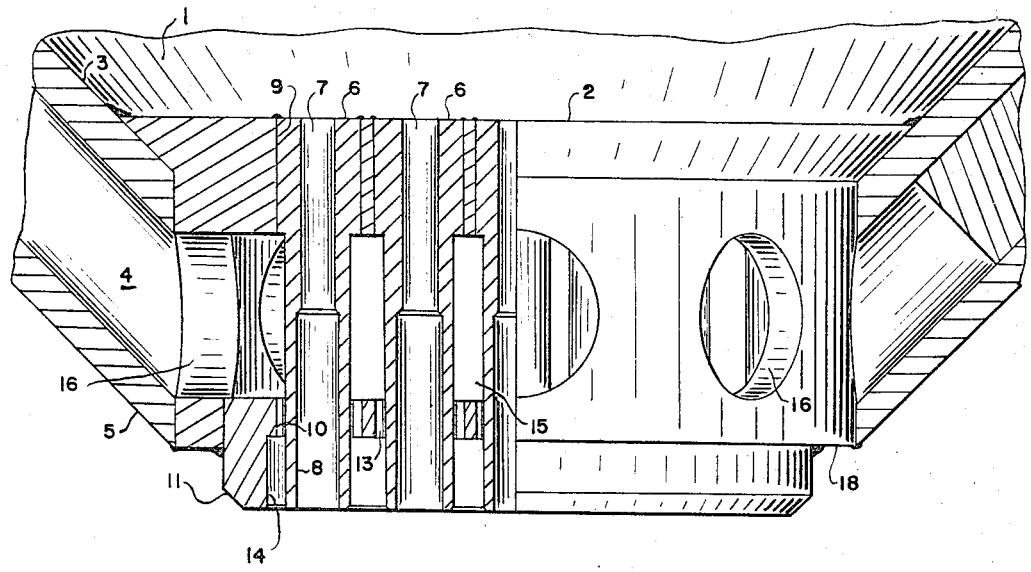
FIG. 1 illustrates a partial cross section view of the chambers containing the molten glass and the orifices communicating with the chambers.

Referring to the drawings the views illustrate the general structure of the glass chambers and orifices. Communication is provided between the central orifices and the center chamber. The peripheral orifices are in communication with the annular glass chamber to provide a coating of the core during drawing of the plural coated glass fibers. One view illustrates the glass as drawn from the orifice arrangement to provide a plurality of glass fibers imbedded in a common coating material. The arrangement provides for controlling the temperature in the glass chambers and a means for drawing the fiber from the orifice.

FIG. 1 illustrates the two glass chambers and the passage means communicating between these chambers and the orifices which form the core and coating of the glass fibers. The center chamber 1 is formed by the plate 2 and the peripheral wall 3. The annular chamber 4 encircles the center chamber 1 and is formed by the peripheral walls 3 and 5.

The plate 2 supports a plurality of sleeves 6 which form the plurality of passages 7. The construction as shown illustrates a plate 2 receiving the plurality of sleeves 6 in openings 9 which are welded to form a fabricated structure. It is, however, pointed out that the fabrication as illustrated is not limiting but merely illustrative of a type of construction to form the chamber and orifice structure as set forth.

The passages 7 extend through the center of the sleeves 6 and have a slightly larger diameter in the lower section to form the orifices 8. The lower portion of the sleeve extends downwardly through an opening 10 in the end plate 11. The opening 10 is a cylindrical opening which receives a square collar 12.

The square collar 12 maintains concentricity of the lower end of the sleeve 6 in the hole 10 of the plate 11. The plate 11 is centrally located within the annular flange 18 of plate 2. The plate 11 and the flange are welded together and also welded to the peripheral wall 5. This general construction maintains a fixed relationship of a plurality of passages 7 relative to each other and a fixed relationship of the peripheral openings 13 formed by the periphery of the hole 10 and the lateral surface of the collar 12. The relationship of areas of the peripheral orifices 14 relative to the areas of the central orifices 8 is also maintained constant.

The chamber 4 for containing the molten glass communicates with the passage 15 surrounding the intermediate portion of the sleeves 6 through the openings 16.

Figure 2:
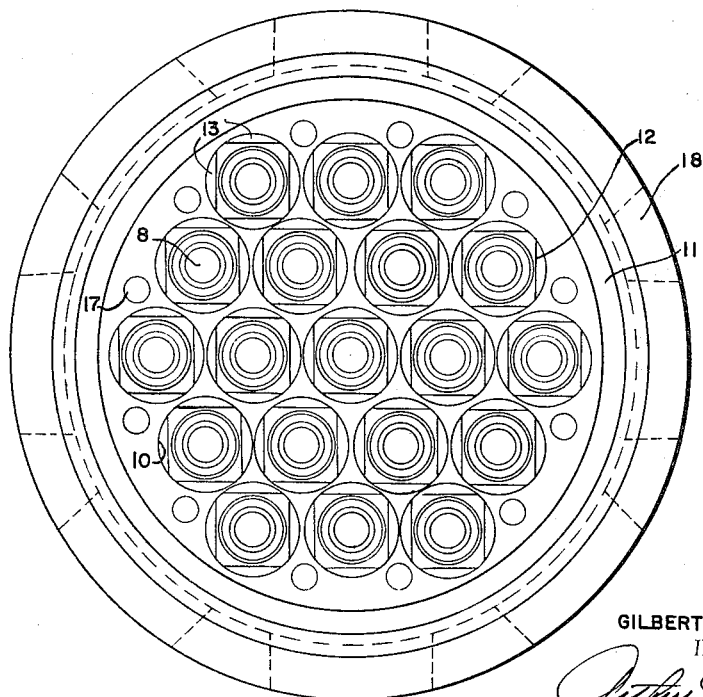
FIG. 2 is a lower view of the orifices.

FIG. 2 illustrates a lower view of a plurality of orifices through which the plural fibers and the coating is drawn. The flange of plate 2 encircles the plate 11. The perforations 17 in the plate 11 form additional orifices for drawing of the coating about the plurality of core fibers. The coating of the fibers is drawn through the peripheral orifices. The central orifice 8 forms the cores of the plurality of fibers. The particular arrangement as illustrated has a circular cross section for the plurality of fibers as drawn. The relationship of areas of the peripheral orifices 14 and perforations 17 has a fixed cross sectional relationship relative to the central orifices 8. The arrangement of axial centers of the central orifices 8 is fixed and any number of orifices and any arrangement might be made for simultaneously drawing a plurality of fibers. The composite arrangement of plural fibers may be used as drawn or they may be severed and stacked in parallel relationship with other lengths of plural fibers as shown. The bundles of fibers of suitable lengths may be arranged in a manner to convey a light signal or light image to and from any point desired.

A rectangular relationship is shown on FIG. 3, the number of the fibers may be increased or decreased to suit the desire of the particular need. Referring to FIG. 3 a plurality of fiber orifices are shown in a linearly horizontal and vertical relationship. This type of arrangement could be made whereby the fibers drawn remain in a rectangular arrangement and may be stacked on each other to provide the desired total number of fibers necessary for the use intended. The fabrication of each of the sleeves 6 and collars 12 is generally similar to that illustrated in FIGS. 1 and 2. The annular opening which receive the sleeves and collars is changed to give the desired arrangement.

FIGS. 5, 6 and 7 illustrate a single sleeve 6 with views to illustrate the general structure. The collar 12 is positioned about the periphery of the lesser diameter of sleeve 6. The collar is firmly fitted on the sleeve, and within the plate 11 to maintain the fixed center of the orifice 8 relative to the orifice 14. The square configuration of the collar 12 having rounded corners provides a four point contact with the inner periphery of the hole 10 and yet provides four peripheral openings 13.

Referring to FIG. 4 the general operation is disclosed with two chambers containing the glass for the core and the coating of the plurality of fibers. The cross sectional view illustrates a chamber 20 and a chamber 21 communicating with their respective orifices. The central passage 22 is in communication with the chamber 20 containing the molten glass for the core of the fiber and is drawn through the orifice 60.

The chamber 21 is in communication with the entrant passage 24 and the passage 25 surrounding each of the sleeves 26. The passage 27 formed by the inner periphery of the opening 28 and the collar 29 is in communication with the peripheral orifices 30. The collar 29 forms an alignment means for the central orifices with the peripheral orifice. It is possible to provide alignment by partial obstruction of the passage nearer the orifice exit. If placed at the orifice exit the aligning elements must be of such a shape with a minimum of obstruction to permit even flow about the periphery of the core forming glass to give an even coating. The peripheral orifices 30 form the common coating 31 which is integral and surrounds the plurality of cores 23, 32 and 33.

A suitable means 34 is provided to draw the plurality of fibers from the above described orifices. The means 34 produces a tensile force on the plurality of fibers to cause a convergence and necking-down of the bundle as it is being drawn. The speed at which the plural fibers are drawn to a degree controls the finished cross sectional dimensions through the bundle of fibers. The temperature within the chambers 20 and 21 also controls the viscosity and the rate at which the fluid will flow through the orifices. The orifices themselves are of a predetermined cross sectional relationship to each other which also effects the relative cross sectional areas of the core and coating of the fibers. The composition of glass would also vary the viscosity and effect the relationship of the speed of drawing the fiber through the orifices, however, for the purpose of this application it is considered that the composition of the material itself is not necessary to illustrate the invention.

The control of the temperature is maintained by the thermocouples 35 and 36 which are connected to the walls forming the chambers 20 and 21. An electrical impulse is transmitted through the control element 37 which is in turn connected to a source of electrical energy 38. The control 37 determines the electrical energy which is supplied to the bars 39 and 40. The bars 39 and 40 provide the connection to the peripheral walls 42 and 43, to maintain the desired heat within the chamber. Any suitable resistant element may be used to provide the proper heating as the current is passed from the bar 39 to 40 or vice versa. The inventor does not wish to limit the heating means to an electrical means. The operation of the device will be described in the following paragraphs.

FIGS. 1 and 2 shows a disclosure of peripheral orifices for drawing a plurality of glass fibers. The general structure of this disclosure is substantially similar to FIGS. 3 and 4. Accordingly, FIG. 4 will be described to give the general operation of the simultaneous drawing of a plurality of fibers within a single coating. The molten glass in the chamber 20 and also the molten glass in the chamber 21 is maintained at a suitable constant temperature by the heat sensing elements 35 and 36 which are connected to the control unit 37. The control unit 37 regulates the flow of electrical energy from the source of electrical energy 38. The flow of electrical energy through the bars 39 and 40 and the walls 42 and 43 cause a heating of the glass within the chambers 20 and 21. This heating maintains an even temperature within the pots which is necessary to maintain the viscosity of the molten glass within chambers 20 and 21. The viscosity of the molten glass in the chambers 20 and 21 will permit that the glass will naturally flow through the central orifices 22 and the peripheral orifices 30. As a force is applied on the bundle 45 the glass will be drawn from the orifices in a manner such that the fibers 23, 32 and 33 are encased within a common coating 31. The force drawing the fibers from the orifices is provided by the means 34 engaging the bundle as indicated. Although the means for severing the bundles or winding the bundles subsequent to drawing is not illustrated any suitable means might be used to provide the desired result.

It is imperative in drawing a plurality of fibers in a manner as illustrated that the concentricity of each of the central orifices 22 is maintained with the peripheral orifices 30. This is necessary to give an even peripheral coating about the outer periphery of the core of each of the fibers. It is necessary that the axial centers of each of the plurality of fibers be maintained constant throughout the process of drawing the fibers. It is also necessary that the orifice cross sectional dimensions be maintained in a constant relationship to likewise control the coating area relative to the core area of the fibers. The viscosities of the core and the coating molten glass in their respective chambers must also be maintained. This is illustrated in a suitable device for controlling the electrical energy which is supplied to the resistive elements which provide the heat necessary. It is understood that electrical source of energy is not the sole means for supplying energy and that any means which is adapted to provide a suitable temperature control and accordingly a viscosity control could be adapted for use with this arrangement.

It is also understood that the direction of drawing of the fiber normal to a surface 50 is most suitable. The drawing of the fiber normal to a planar surface on the orifice provides the evenness of the coating on the periphery of each of the plurality of core fibers. It is also understood that if the operator should desire any distortion in any direction that the fiber could be drawn at an angle to the line normal of the surface 50 of the exit plane of the plurality of surfaces.

The preceding description and drawings set forth the preferred embodiment of this invention. It is understood that other modifications might be devised which would fall within the scope of the invention of the attached claim.

I claim:

1. A glass fiber forming pot for simultaneously forming a plurality of coated glass fibers comprising, means defining a plurality of glass chambers, means controlling the temperature and viscosity in said glass chambers, means defining a plurality of central orifices communicating with the first of said glass chambers for forming a plurality of cores of glass fibers, means defining a plurality of radially spaced orifices each spaced from said central orifices forming a common core coating for each of said fibers, alignment means maintaining concentricity of the peripheral orifices with their mating central orifice to provide an even peripheral common coating on each of the cores of said fibers.

2. A glass fiber forming pot for forming a plurality of glass fibers in a common coating, means defining a plurality of glass chambers, means defining a plurality of central orifices communicating with the first of said glass chambers, means defining a plurality of annular orifices each of said annular orifices aligned with a mating central orifice, means controlling the temperature in said glass chambers to control the viscosity of molten glass in said chambers, alignment means associated with said orifices maintaining concentricity of said orifices to control the concentricity of each annular orifice with the mating central orifice to provide a plurality of glass fibers imbedded in a common coating of an even peripheral thickness.

3. Apparatus for drawing multiple-core optical fibers with a unitary continuous coating comprising:
first and second chambers for holding molten materials;
a plurality of parallel elongated sleeve-shaped core orifice members connected in spaced relationship with the first chamber for receiving molten fiber-forming material;
a perforated plate having aligned annular orifices connected for receiving molten fiber-coating material from the second chamber, the core orifice members extending downwardly through the aligned annular orifices;
collar means disposed about the core orifice members for positioning the core orfiice members in the annular orifices while permitting flow of molten fiber-coating material through the annular orifices; and
means for drawing the molten fiber-forming material from the core orifice members simultaneously while drawing the molten fiber-coating material from the annular orifices to form multiple-core optical fibers embedded in a continuous common coating.

4. The apparatus of claim 3 wherein the core orifice members have outlets below the perforated plate and a peripheral extension of the plate forms a recess.

5. Apparatus for producing multiple-core optical fibers imbedded in a common coating comprising
means for maintaining molten fiber-forming material and molten fiber-coating material in separate bodies;
means for simultaneously drawing a plurality of parallel optical fibers from core orifices connected for receiving fiber-forming material;
means for forming a continuous coating surrounding the individual fibers including means for drawing fiber-coating material from annular orifice means adjacent the core orifices to provide a coating completely filling areas between the fibers with molten fiber-forming material; and
alignment means for holding the core orifices in spaced relationship with the annular orifice means for preventing relative lateral movement of the orifices.

6. The apparatus of claim 5 including means for attenuating the coated multi-core fibers while in a molten condition.

References Cited by the Examiner

UNITED STATES PATENTS

| | | |
|---|---|---|
| 2,900,708 | 8/1959 | Pond. |
| 3,088,297 | 4/1963 | Kapany et al. _____ 65—145 X |
| 3,166,788 | 1/1965 | Kiser. |
| 3,192,023 | 6/1965 | Stalego _____ 65—121 X |
| 3,197,813 | 8/1965 | Grand. |
| 3,209,402 | 10/1965 | Riley et al. |
| 3,209,641 | 10/1965 | Upton. |

FOREIGN PATENTS 1,158,476   6/1958   France.

DONALL H. SYLVESTER, *Primary Examiner.*

R. L. LINDSAY, *Assistant Examiner.*